US009672868B2

(12) United States Patent
Bloch et al.

(10) Patent No.: US 9,672,868 B2
(45) Date of Patent: Jun. 6, 2017

(54) SYSTEMS AND METHODS FOR SEAMLESS MEDIA CREATION

(71) Applicant: JBF Interlude 2009 LTD—Israel, Tel Aviv-Yafo (IL)

(72) Inventors: Yoni Bloch, Brooklyn, NY (US); Tal Zubalsky, Brooklyn, NY (US); Yuval Hofshy, Kfar Saba (IL); Barak Feldman, Tenafly, NJ (US)

(73) Assignee: JBF Interlude 2009 LTD (IL)

( * ) Notice: Subject to any disclaimer, the term of this patent is extended or adjusted under 35 U.S.C. 154(b) by 1 day.

(21) Appl. No.: 14/700,862

(22) Filed: Apr. 30, 2015

(65) Prior Publication Data

US 2016/0322054 A1    Nov. 3, 2016

(51) Int. Cl.
*G10L 19/00*    (2013.01)
*G11B 27/10*    (2006.01)
(Continued)

(52) U.S. Cl.
CPC ..... *G11B 27/105* (2013.01); *H04N 21/26258* (2013.01); *H04N 21/4431* (2013.01);
(Continued)

(58) Field of Classification Search
None
See application file for complete search history.

(56) References Cited

U.S. PATENT DOCUMENTS 5,568,602 A    10/1996   Callahan et al.
5,607,356 A     3/1997   Schwartz
(Continued)

FOREIGN PATENT DOCUMENTS

DE    10053720 A1    4/2002
EP     1033157 A2    9/2000
(Continued)

OTHER PUBLICATIONS

An ffmpeg and SDL Tutorial, "Tutorial 05: Synching Video," Retrieved from internet on Mar. 15, 2013: <http://dranger.com/ffmpeg/tutorial05.html>, 4 pages.
(Continued)

*Primary Examiner* — Qian Yang
(74) *Attorney, Agent, or Firm* — Goodwin Procter LLP

(57) ABSTRACT

Systems and methods for nonlinear media playback using a linear media player are described. In one implementation, a video tree representing a branching video presentation is provided, and a dynamic playlist is provided to a linear video player. A controller component interacts with the linear video player through a standard interface of the linear video player. During playback of a video content segment in the dynamic playlist by the linear video player, an indication of a user interaction with the playing video content segment is received by the controller component and from the linear video player via the standard interface, and the dynamic playlist is modified based on video content segments in a branch of the video tree. In another implementation, an uncompressed media file is selected and combined with a preceding and/or following media file. The combined files are compressed and a portion of the compressed file corresponding to the original media file is extracted.

46 Claims, 14 Drawing Sheets

(51) Int. Cl.

| | | |
|---|---|---|
| H04N 21/262 | (2011.01) | |
| H04N 21/443 | (2011.01) | |
| H04N 21/482 | (2011.01) | |
| H04N 21/61 | (2011.01) | |
| H04N 21/845 | (2011.01) | |
| H04N 21/8541 | (2011.01) | |
| G10L 19/16 | (2013.01) | |

(52) U.S. Cl.
CPC ..... *H04N 21/4825* (2013.01); *H04N 21/6125* (2013.01); *H04N 21/8456* (2013.01); *H04N 21/8541* (2013.01); *G10L 19/167* (2013.01)

(56) References Cited

U.S. PATENT DOCUMENTS

| | | |
|---|---|---|
| 5,636,036 A | 6/1997 | Ashbey |
| 5,676,551 A | 10/1997 | Knight et al. |
| 5,734,862 A | 3/1998 | Kulas |
| 5,818,435 A | 10/1998 | Kozuka et al. |
| 6,122,668 A | 9/2000 | Teng et al. |
| 6,128,712 A | 10/2000 | Hunt et al. |
| 6,222,925 B1 | 4/2001 | Shiels et al. |
| 6,298,482 B1 | 10/2001 | Seidman et al. |
| 6,728,477 B1 | 4/2004 | Watkins |
| 6,801,947 B1 | 10/2004 | Li |
| 7,155,676 B2 | 12/2006 | Land et al. |
| 7,310,784 B1 | 12/2007 | Gottlieb et al. |
| 7,379,653 B2 | 5/2008 | Yap et al. |
| 7,444,069 B1 | 10/2008 | Bernsley |
| 7,627,605 B1 | 12/2009 | Lamere et al. |
| 7,917,505 B2 | 3/2011 | van Gent et al. |
| 8,065,710 B2 | 11/2011 | Malik |
| 8,190,001 B2 | 5/2012 | Bernsley |
| 8,276,058 B2 | 9/2012 | Gottlieb et al. |
| 8,281,355 B1 | 10/2012 | Weaver et al. |
| 8,600,220 B2 | 12/2013 | Bloch et al. |
| 8,650,489 B1 | 2/2014 | Baum et al. |
| 8,860,882 B2 | 10/2014 | Bloch et al. |
| 8,977,113 B1 | 3/2015 | Rumteen et al. |
| 9,009,619 B2 | 4/2015 | Bloch et al. |
| 9,021,537 B2 | 4/2015 | Funge et al. |
| 9,190,110 B2 | 11/2015 | Bloch |
| 9,257,148 B2 | 2/2016 | Bloch et al. |
| 9,271,015 B2 | 2/2016 | Bloch et al. |
| 9,390,099 B1 * | 7/2016 | Wang ............... G06F 17/30153 |
| 2002/0091455 A1 | 7/2002 | Williams |
| 2002/0105535 A1 | 8/2002 | Wallace et al. |
| 2002/0106191 A1 | 8/2002 | Betz et al. |
| 2002/0120456 A1 | 8/2002 | Berg et al. |
| 2002/0177914 A1 | 11/2002 | Chase |
| 2003/0159566 A1 | 8/2003 | Sater et al. |
| 2003/0183064 A1 | 10/2003 | Eugene et al. |
| 2003/0184598 A1 | 10/2003 | Graham |
| 2003/0221541 A1 | 12/2003 | Platt |
| 2004/0138948 A1 | 7/2004 | Loomis |
| 2004/0172476 A1 | 9/2004 | Chapweske |
| 2005/0019015 A1 | 1/2005 | Ackley et al. |
| 2005/0055377 A1 | 3/2005 | Dorey et al. |
| 2005/0091597 A1 | 4/2005 | Ackley |
| 2005/0102707 A1 | 5/2005 | Schnitman |
| 2006/0028951 A1 | 2/2006 | Tozun et al. |
| 2006/0064733 A1 | 3/2006 | Norton et al. |
| 2006/0150072 A1 | 7/2006 | Salvucci |
| 2006/0155400 A1 | 7/2006 | Loomis |
| 2006/0200842 A1 | 9/2006 | Chapman et al. |
| 2006/0224260 A1 | 10/2006 | Hicken et al. |
| 2007/0003149 A1 | 1/2007 | Nagumo et al. |
| 2007/0024706 A1 | 2/2007 | Brannon et al. |
| 2007/0033633 A1 | 2/2007 | Andrews et al. |
| 2007/0118801 A1 | 5/2007 | Harshbarger et al. |
| 2007/0157261 A1 | 7/2007 | Steelberg et al. |
| 2007/0162395 A1 | 7/2007 | Ben-Yaacov et al. |
| 2007/0239754 A1 | 10/2007 | Schnitman |
| 2007/0263722 A1 | 11/2007 | Fukuzawa |
| 2008/0019445 A1 | 1/2008 | Aono et al. |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0086754 A1 | 4/2008 | Chen et al. |
| 2008/0091721 A1 | 4/2008 | Harboe et al. |
| 2008/0092159 A1 | 4/2008 | Dmitriev et al. |
| 2008/0148152 A1 | 6/2008 | Blinnikka et al. |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0024923 A1 | 1/2009 | Hartwig et al. |
| 2009/0055880 A1 | 2/2009 | Batteram et al. |
| 2009/0063681 A1 | 3/2009 | Ramakrishnan et al. |
| 2009/0116817 A1 | 5/2009 | Kim et al. |
| 2009/0199697 A1 | 8/2009 | Lehtiniemi et al. |
| 2009/0228572 A1 | 9/2009 | Wall et al. |
| 2009/0320075 A1 | 12/2009 | Marko |
| 2010/0017820 A1 | 1/2010 | Thevathasan et al. |
| 2010/0042496 A1 | 2/2010 | Wang et al. |
| 2010/0077290 A1 | 3/2010 | Pueyo |
| 2010/0146145 A1 | 6/2010 | Tippin et al. |
| 2010/0153512 A1 | 6/2010 | Balassanian et al. |
| 2010/0167816 A1 | 7/2010 | Perlman et al. |
| 2010/0186579 A1 | 7/2010 | Schnitman |
| 2010/0262336 A1 | 10/2010 | Rivas et al. |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293455 A1 | 11/2010 | Bloch |
| 2010/0332404 A1 | 12/2010 | Valin |
| 2011/0007797 A1 | 1/2011 | Palmer et al. |
| 2011/0010742 A1 | 1/2011 | White |
| 2011/0026898 A1 | 2/2011 | Lussier et al. |
| 2011/0096225 A1 | 4/2011 | Candelore |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0191684 A1 | 8/2011 | Greenberg |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0246885 A1 | 10/2011 | Pantos et al. |
| 2011/0252320 A1 | 10/2011 | Arrasvuori et al. |
| 2011/0264755 A1 | 10/2011 | De Villiers |
| 2012/0005287 A1 | 1/2012 | Gadel et al. |
| 2012/0094768 A1 | 4/2012 | McCaddon et al. |
| 2012/0110620 A1 | 5/2012 | Kilar et al. |
| 2012/0134646 A1 | 5/2012 | Alexander |
| 2012/0198412 A1 | 8/2012 | Creighton et al. |
| 2012/0308206 A1 | 12/2012 | Kulas |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0097643 A1 | 4/2013 | Stone et al. |
| 2013/0188923 A1 | 7/2013 | Hartley et al. |
| 2013/0259442 A1 | 10/2013 | Bloch et al. |
| 2013/0282917 A1 | 10/2013 | Reznik et al. |
| 2013/0308926 A1 | 11/2013 | Jang et al. |
| 2014/0040280 A1 | 2/2014 | Slaney et al. |
| 2014/0078397 A1 | 3/2014 | Bloch et al. |
| 2014/0082666 A1 | 3/2014 | Bloch et al. |
| 2014/0129618 A1 | 5/2014 | Panje et al. |
| 2014/0178051 A1 | 6/2014 | Bloch et al. |
| 2014/0270680 A1 | 9/2014 | Bloch et al. |
| 2014/0282013 A1 | 9/2014 | Amijee |
| 2014/0380167 A1 | 12/2014 | Bloch et al. |
| 2015/0067723 A1 | 3/2015 | Bloch et al. |
| 2015/0104155 A1 | 4/2015 | Bloch et al. |
| 2015/0179224 A1 | 6/2015 | Bloch et al. |
| 2015/0181301 A1 | 6/2015 | Bloch et al. |
| 2015/0199116 A1 | 7/2015 | Bloch et al. |
| 2015/0293675 A1 | 10/2015 | Bloch et al. |
| 2015/0294685 A1 | 10/2015 | Bloch et al. |

(56) References Cited

U.S. PATENT DOCUMENTS

2016/0104513 A1     4/2016   Bloch et al.
2016/0105724 A1     4/2016   Bloch et al.

FOREIGN PATENT DOCUMENTS

| | | |
|---|---|---|
| EP | 2104105 A1 | 9/2009 |
| GB | 2359916 A | 9/2001 |
| GB | 2428329 A | 1/2007 |
| JP | 2008005288 A | 1/2008 |
| WO | WO-00/59224 A1 | 10/2000 |
| WO | WO-2007/062223 A2 | 5/2007 |
| WO | WO-2007/138546 A2 | 12/2007 |
| WO | WO-2008/001350 A2 | 1/2008 |
| WO | WO-2008/052009 A2 | 5/2008 |
| WO | WO-2008/057444 A2 | 5/2008 |
| WO | WO-2009/137919 A1 | 11/2009 |

OTHER PUBLICATIONS

Archos Gen 5 English User Manual Version 3.0, Jul. 26, 2007, pp. 1-81.

Barlett, Mitch, "iTunes 11: How to Queue Next Song," *Technipages*, Oct. 6, 2008, pp. 1-8, retrieved on Dec. 26, 2013 from the internet: http://www.technipages.com/itunes-queue-next-song.html.

Gregor Miller et al. "MiniDiver: A Novel Mobile Media Playback Interface for Rich Video Content on an iPhoneTM", Entertainment Computing A ICEC 2009, Sep. 3, 2009, pp. 98-109.

International Search Report for International Patent Application PCT/IL2010/000362 dated Aug. 25, 2010, 2 pages.

International Search Report for International Patent Application PCT/IL2012/000080 dated Aug. 9, 2012, 4 pages.

International Search Report for International Patent Application PCT/IL2012/000081 dated Jun. 28, 2012, 4 pages.

International Search Report and Written Opinion for International Application PCT/IB2013/001000 mailed Jul. 31, 2013, 12 pages.

Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, pp. 1-8.

Sodagar, I., (2011) "The MPEG-DASH Standard for Multimedia Streaming Over the Internet", *IEEE Multimedia*, IEEE Service Center, New York, NY, US, vol. 18, No. 4, pp. 62-67.

Supplemental European Search Report for EP10774637.2 (PCT/IL2010/000362) mailed Jun. 20, 2012, 6 pages.

Supplemental European Search Report for EP13184145 dated Jan. 30, 2014, 6 pages.

Yang, H, et al., "Time Stamp Synchronization in Video Systems," Teletronics Technology Corporation, <http://www.ttcdas.com/products/dausencoders/pdf/techpapers/tp2010timestampvideosystem.pdf>, Abstract, 8 pages.

\* cited by examiner

Standard

| Address | Length |
|---|---|
| Video A byte: 0 | 10 sec |
| Video A byte: 1000 | 10 sec |
| Video A byte: 2000 | 10 sec |
| Video A byte: 3000 | 10 sec |
| Video A byte: 4000 | 10 sec |
| Video A byte: 5000 | 10 sec |

FIG. 3A

Branching

| Address | Length |
|---|---|
| Video A byte: 0 | 1 sec |
| Video A byte: 100 | 1 sec |
| Video A byte: 200 | 1 sec |
| Video A byte: 300 | 1 sec |
| Video A byte: 400 | 1 sec |
| Video B2 byte: 0 | 1 sec |
| Video B2 byte: 100 | 1 sec |
| Video B2 byte: 200 | 1 sec |
| Video B2 byte: 300 | 1 sec |
| Video C4 byte: 0 | 1 sec |
| Video C4 byte: 100 | 1 sec |

FIG. 3B

| Concatenate | Extract |
|---|---|
| A-B1 | A |
| A-B1-C1 | B1 |
| A-B2-C3 | B2 |
| B1-C1-D1 | C1 |
| B1-C2-D1 | C2 |
| B2-C3-D3 | C3 |
| B2-C4-D3 | C4 |
| C1-D1 | D1 |
| C1-D2 | D2 |
| C3-D3 | D3 |
| C4-D4 | D4 |

FIG. 9B

| Concatenate | Extract |
|---|---|
| A-B1-C1-D1 | A,B1,C1,D1 |
| A-B1-C2-D2 | C2,D2 |
| A-B2-C3-D3 | B2,C3,D3 |
| A-B2-C4-D4 | C4,D4 |

FIG. 9C

SYSTEMS AND METHODS FOR SEAMLESS MEDIA CREATION

FIELD OF THE INVENTION

The present disclosure relates generally to nonlinear video playback and, more particularly, to systems and methods for streaming branching video content to a video player that is otherwise limited to the playback of linear video content.

BACKGROUND

Over the past decade there has been an exponential growth in the prevalence of streaming media in the lives of the general public. Users frequently listen to streaming music using services such as Pandora and Spotify, and watch streaming television shows, movies, and video clips from providers such as Hulu, Netflix, and YouTube. Interactive streaming multimedia content, though less common, is also available. Existing forms of interactive videos allow a viewer to make choices on how to proceed through pre-defined video paths; however, this functionality is accomplished using separate video segments that are jumped to upon selection, resulting in a noticeable disconnect in audio and video between consecutive segments. Further, some interactive videos require custom players or other software not readily available to certain viewers. Without access to such software, these viewers are unable to experience any portion of the interactive media.

SUMMARY

Systems and methods for nonlinear video playback using linear real-time video players are described. In one aspect, video tree that represents a branching video presentation is provided. The video tree can have a plurality of branches, with each branch including one or more video content segments. A server provides a dynamic playlist to a linear video player executing on a client device, where the dynamic playlist includes one or more references to video content segments of the video tree to be played by the linear video player. The server can be a remote server and/or a virtual server that executes on the client device. A controller component interacts with the linear video player through a standard interface of the linear video player. During playback of a video content segment in the dynamic playlist by the linear video player, an indication of a user interaction with the playing video content segment is received by the controller component and from the linear video player via the standard interface. The indication can include a decision to traverse a particular branch in the video tree. The dynamic playlist is then modified based on one or more of the video content segments in the particular branch to traverse.

In one implementation, the indication further includes a current playback location of the video and, based on the current playback location, the dynamic playlist is modified. The indication can be received at a controller executing on the client device and provided to the server. The dynamic playlist can be modified by adding and/or removing references to video content segments. The dynamic playlist can also be modified by creating a new dynamic playlist starting from a requested point in time. The dynamic playlist can be modified substantially immediately following the occurrence of the user interaction.

In a further implementation, the linear video player is directed to display a graphical overlay on the playing video content segment. The linear video player can further be directed to modify the graphical overlay based on the user interaction.

In yet another implementation, the server provides a second dynamic playlist to a second linear video player executing on a second client device. The second dynamic playlist can be modified independently of the first dynamic playlist based on indications of user interactions with video content segments played by the second linear video player.

In another aspect, a computer-implemented method includes: (a) selecting an uncompressed media file; (b) identifying, based on the selected uncompressed media file, at least one of a preceding uncompressed media file and a following uncompressed media file; (c) concatenating the selected uncompressed media file and at least one of the preceding uncompressed media file and the following uncompressed media file to form a concatenated uncompressed media file; (d) compressing the concatenated uncompressed media file to form a compressed media file; and (e) selecting a portion of the compressed media file as a compressed version of the selected uncompressed media file. In some implementations, the media file includes audio data.

In one implementation, a video tree is provided that includes a plurality of branches, with each branch having a plurality of media files. The preceding and/or following uncompressed media files can be identified based on a branch of the video tree. Steps (a) through (e) can also be performed for a plurality of media files in the video tree.

In another implementation, the media files in the video tree each include compressed audio data, and compressed audio data of a media file selected from the video tree to is converted uncompressed audio data. The selected uncompressed media file can be concatenated to the end of the preceding uncompressed media file, and the following uncompressed media file can be concatenated to the end of the selected uncompressed media file.

In yet another implementation, the duration of the selected uncompressed media file is stored and the portion is selected based at least in part on the stored duration. An intermediate portion of the compressed media file can be extracted and stored as the compressed version of the selected uncompressed media file. A plurality of portions of the compressed media file can be selected as respective compressed versions of the concatenated uncompressed media files. Playback can occur seamlessly among the compressed versions of the concatenated uncompressed media files.

Aspects of these inventions also include corresponding systems and computer programs. Further aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

FIGS. 3A and 3B depict example playlists for a standard and branching streaming video player, respectively.

FIGS. 9B and 9C depict example node sets to produce extracted seamless media segments.

DETAILED DESCRIPTION

Figure 1:
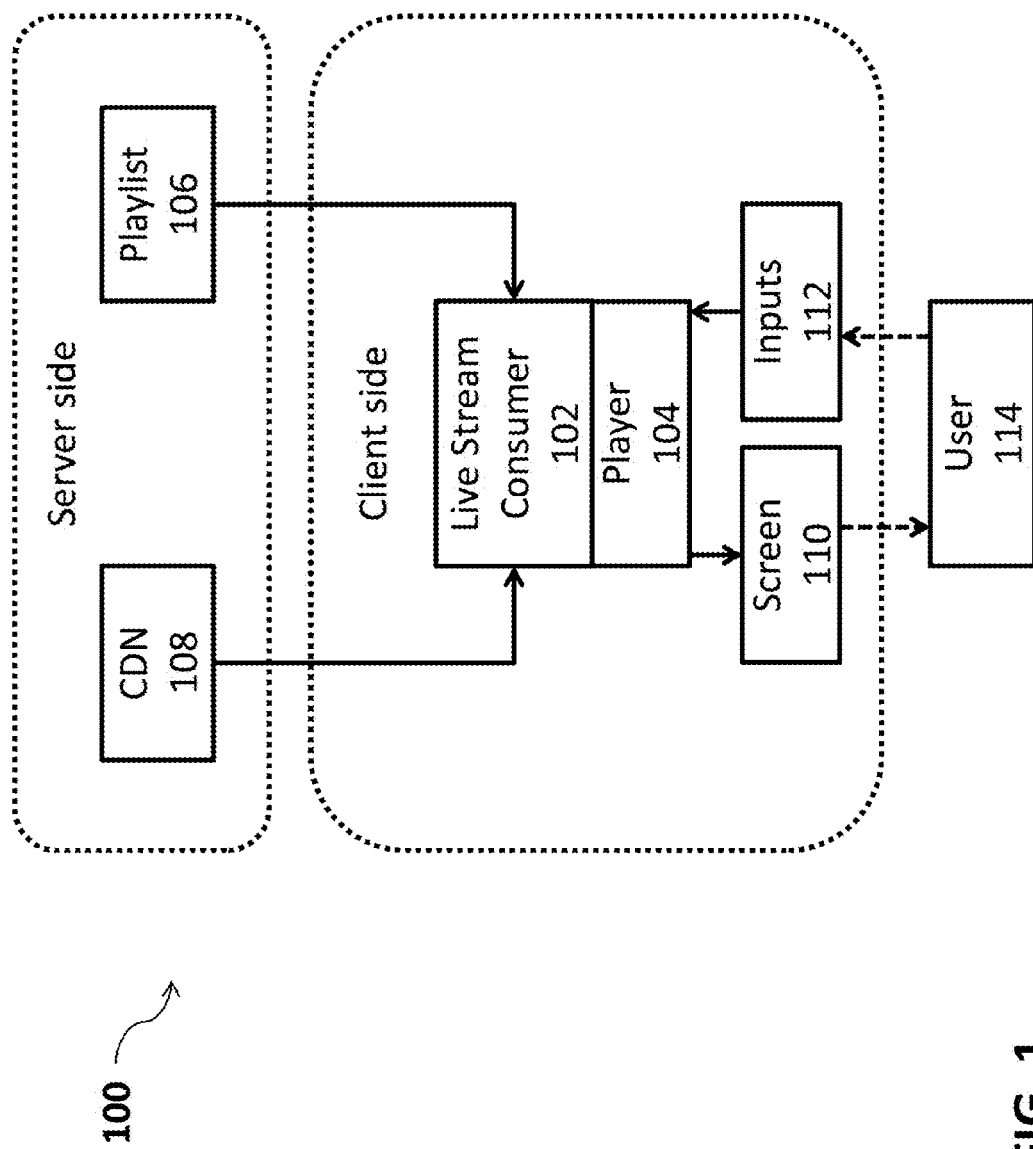
FIG. 1 depicts an example client-server architecture for a standard streaming video player.

Described herein are various implementations of methods and supporting systems for playing non-linear media content with a linear content player. Non-linear content can include interactive video structured in a video tree, hierarchy, or other form. A video tree can be formed by nodes that are connected in a branching, hierarchical, or other linked form. Nodes can each have an associated video segment, audio segment, graphical user interface (GUI) elements, and/or other associated media. Users (e.g., viewers) can watch a video that begins from a starting node in the tree and proceeds along connected nodes in a branch or path. Upon reaching a point during playback of the video where multiple video segments branch off from a segment, the user can interactively select the branch or path to traverse and, thus, the next video segment to watch.

As referred to herein, a particular branch or path in an interactive media structure, such as a video tree, can refer to a set of consecutively linked nodes between a starting node and ending node, inclusively, or can refer to some or all possible linked nodes that are connected subsequent to (e.g., sub-branches) or that include a particular node. Branched video can include seamlessly assembled and selectably presentable multimedia content such as that described in U.S. patent application Ser. No. 13/033,916, filed on Feb. 24, 2011, and entitled "System and Method for Seamless Multimedia Assembly" (the "Seamless Multimedia Assembly application"), and U.S. patent application Ser. No. 14/107,600, filed on Dec. 16, 2013, and entitled "Methods and Systems for Unfolding Video Pre-Roll," the entireties of which are hereby incorporated by reference.

The prerecorded video segments in a video tree or other structure can be selectably presentable multimedia content; that is, some or all of the video segments in the video tree can be individually or collectively played for a user based upon the user's selection of a particular video segment, an interaction with a previous or playing video segment, or other interaction that results in a particular video segment or segments being played. The video segments can include, for example, one or more predefined, separate multimedia content segments that can be combined in various manners to create a continuous, seamless presentation such that there are no noticeable gaps, jumps, freezes, delays, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the end of the segment itself.

If a user does not make a selection at a decision point or during a decision period, a default, previously identified selection, or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, stored user profiles, preferred products or services, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments can form a seamless multimedia content path or branch, and users can take multiple paths over multiple play-throughs, and experience different complete, start-to-finish, seamless presentations. Further, one or more multimedia segments can be shared among intertwining paths while still ensuring a seamless transition from a previous segment and to the next segment. The content paths can be predefined, with fixed sets of possible transitions in order to ensure seamless transitions among segments. The content paths can also be partially or wholly undefined, such that, in some or all instances, the user can switch to any known video segment without limitation. There can be any number of predefined paths, each having any number of predefined multimedia segments. Some or all of the segments can have the same or different playback lengths, including segments branching from a single source segment.

Traversal of the nodes along a content path in a tree can be performed by selecting among options that appear on and/or around the video while the video is playing. In some implementations, these options are presented to users at a decision point and/or during a decision period in a content segment. Some or all of the displayed options can hover and then disappear when the decision period ends or when an option has been selected. Further, a timer, countdown or other visual, aural, or other sensory indicator can be presented during playback of content segment to inform the user of the point by which he should (or, in some cases, must) make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

A segment that is played after (immediately after or otherwise) a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video continue playing regardless of whether a segment selection is made, and no noticeable gaps appear in audio or video playback between any connecting segments. In some instances, the video continues on to another segment after a certain amount of time if none is chosen, or can continue playing in a loop.

In one example, the multimedia content is a music video in which the user selects options upon reaching segment decision points to determine subsequent content to be played. First, a video introduction segment is played for the user. Prior to the end of the segment, a decision point is reached at which the user can select the next segment to be played from a listing of choices. In this case, the user is presented with a choice as to who will sing the first verse of the song: a tall, female performer, or a short, male performer. The user is given an amount of time to make a selection (i.e., a decision period), after which, if no selection is made, a default segment will be automatically selected. The default can be a predefined or random selection. Of note, the media content continues to play during the time the user is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the user is presented with other choices at other decisions points, depending on which path of choices is followed. Ultimately, the user arrives at a final segment, having traversed a complete multimedia content path.

FIG. 1 depicts a client-server architecture 100 for a typical streaming video player capable of playing linear videos. In this implementation, a client-side Live Stream Consumer component 102 receives media files from a content delivery network server 108 or other media server for playback by a media player 104. The media files can be streamed in real-time as the media is being played by the client-side player 104 (e.g., on an end user device). A user 114 can interact with the player 104 by providing inputs 112 to the player 104 via, e.g., basic controls such as play, pause, stop, seek, and volume controls. The user 114 can view the output of the player 104 on a display screen 110 (e.g., a smartphone screen).

A playlist 106 provided by a server and accessible to the client defines the list of media files that are to be provided to the Live Stream Consumer 102. In one example, the playlist 106 includes a static list of all media segments with corresponding references or addresses (e.g., byte offsets or other location indicators in the media being streamed) and times of play. In another example, the playlist 106 includes a single line with a link or reference to a video or several lines with links or references to different parts of a video. The player 104 can also support a dynamic form of the playlist 106, in which entries in the playlist 106 can be added, changed, and/or removed while the player 106 is playing media content and the content is being streamed to the live stream consumer 102.

Figure 2A:
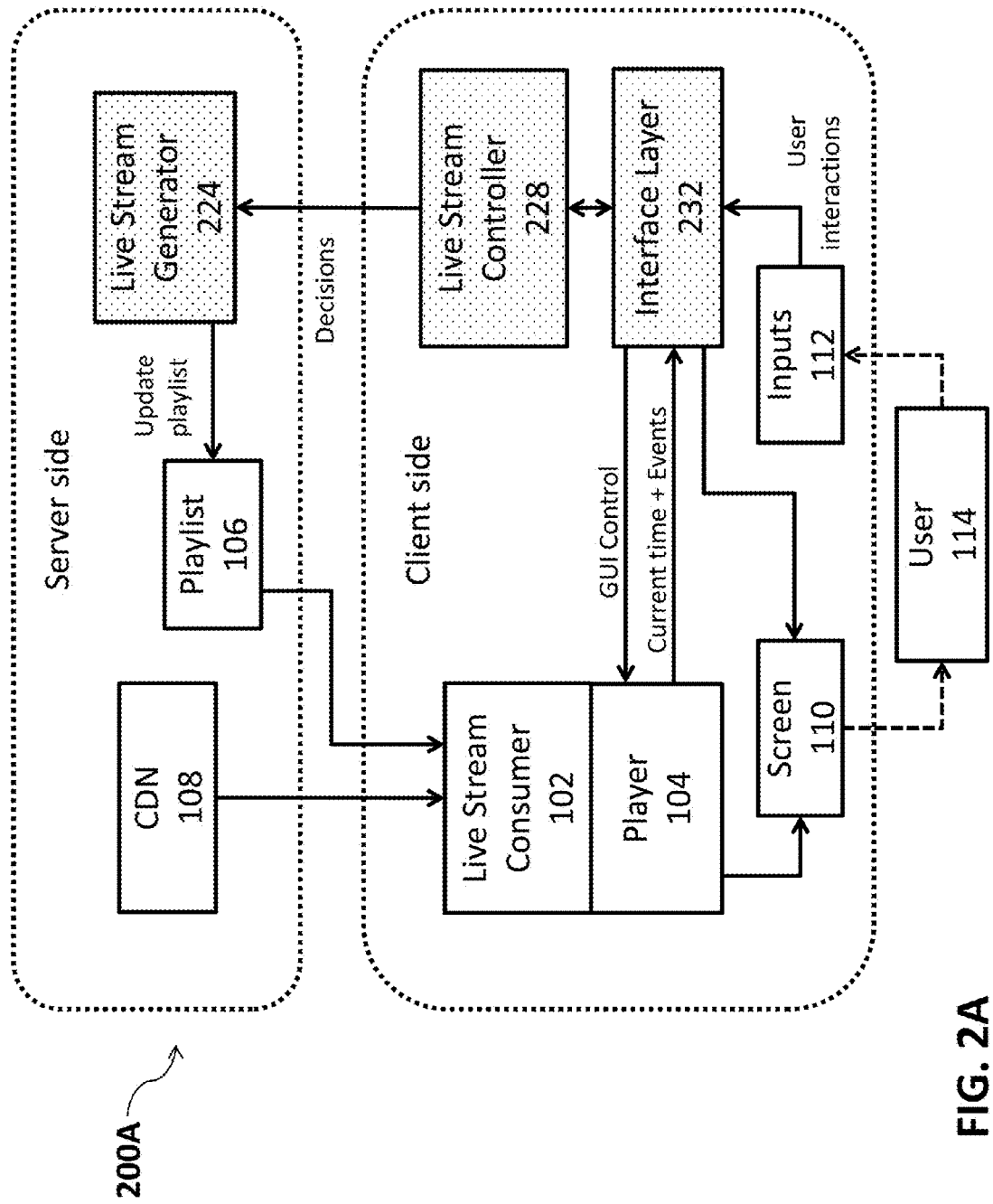
FIGS. 2A and 2B depict example client-server architectures for a standard streaming video player modified to support branching media content.

FIG. 2A depicts one implementation of a client-server architecture 200A for a streaming video player capable of playing branching videos. The client-server architecture 200A improves the standard streaming video player architecture 100 of FIG. 1 by including additional server- and client-side components (shown as shaded) that allow the standard player to support branching video. In other words, a custom video player is not required, and the added components can interface with the existing player through standard or otherwise available interfaces. Advantageously, this approach can be used in platforms that support live streaming protocols based on HTTP (e.g., HTML5 browsers with HTTP Live Streaming (HLS) protocol support, such as that used for Apple® iOS-based devices).

The player 104 plays streaming media according to the playlist 106 and can provide a GUI to be displayed on the screen 110. The player 104 can include a Player Core subcomponent that is responsible for wrapping low-level interactive stream modules and providing a generic framework that can be used by other components of the branching video architecture 200A. The player 104 can manage the manner in which requests are received from other components or applications and how events are fired from lower layers to the components/applications. The player 104 can further include a Player application programming interface (API) composed of standard APIs that other components and applications can use to create interactive experiences (e.g., GUI layers) overlaid on a video or other form of streaming media.

As previously noted, the playlist 106 contains a listing of media segments to be played by the player 106. Referring to FIGS. 3A and 3B, in one implementation, the playlist 106 is a configuration file which holds a list of some or all segments to be streamed and played by the player 104 for a current session. The playlist 106 can include a reference to each segment (e.g., link or address and, if needed, a byte location) and the length of play of the segment. For example, as shown in FIG. 3A, a playlist entry in a playlist used by a standard streaming video player (e.g., as in standard player architecture 100) is "Video A byte:1000 10 sec", where "1000" is the byte location of the video segment corresponding to the entry and "10 sec" is the length of the segment. The standard playlist can be static or dynamic, in that the standard playlist can have entries added, removed, and/or changed in real time. Similarly, as shown in FIG. 3B, a playlist entry in a playlist used by a branching streaming video player (e.g., as in branching player architectures 200A and 200B) is "Video B2 byte: 300 1 sec", where "300" is the byte location of the video segment corresponding to the entry and "1 sec" is the length of the segment. This dynamic playlist 106 can continuously change according to the tree structure of the branching video and received user inputs 112. For example, the playlist 106 can be modified substantially immediately (e.g., immediately but for time allowed for network communication and processing) following a user interaction to reflect a new segment to download based on a user choice.

Referring back to FIG. 2A, on the client side, the Live Stream Consumer component 102 operates in the same manner as in the standard player architecture 100. Specifically, the Live Stream Consumer 102 sets up and manages a video or other media stream received from CDN 108 or other media source. In some instances, the Live Stream Consumer 102 is a component of the client operating system on which the branching video player executes. The Live Stream Consumer 102 interfaces with the standard video player 104, which plays back the streaming content for the user 114 via display screen 110. Of note, the Live Stream Consumer 102 can use the same method of communication with the player 104 as in the standard architecture 100, even though the playlist 106 can be changed in real-time according to user inputs 112.

User inputs 112 are directed to the Interface Layer component 232, on the client side, which creates an interactive layer over video presented by the player 104. The interactive layer can include buttons, timers, progress bars, and/or other interactive components overlaid on the video display, such as that described in U.S. Pat. No. 9,009,619, issued on Apr. 14, 2015, and entitled, "Progress Bar for Branched Videos," the entirety of which is incorporated by reference herein. Some interactive components can appear, disappear, or change based on the currently playing video (e.g., a timer can show the amount of time left in a decision period, buttons can appear that provide options to the user 114 that determine which video branch to traverse, etc.). Other interactive components allow the user 114 to provide inputs 112 to the branching video player (e.g., button selection).

The Interface Layer component 232 synchronizes display of the interactive layer with playback of audio and/or video by receiving timestamp and, in some instances, event information from the player 104. Upon a user interaction with the Interface Layer 232 component, the Interface Layer 232 component can update interactive components on the interactive layer of a playing video as displayed on the screen 110 to ensure synchronization with the audio and/or video.

The Interface Layer component 232 can direct basic playback controls (e.g., play, pause, volume control, etc.) to the standard player 104 so that the player 104 responds to the controls. Communication between the Interface Layer component 232 and the player 104 can be accomplished using standard or other existing interfaces with the player 104, such as web APIs. In one example, this is achieved by manipulating the properties of HTML5 elements (e.g., using the HTMLVideoElement and HTMLAudioElement interfaces). Further, the Interface Layer component 232 can direct certain user decisions or other events (e.g., interactions with a branching video that affect how the video is traversed) to the Live Stream Controller component 228 (discussed further below), which can direct the server-side Live Stream Generator component 224 (discussed further below) to modify the playlist 106.

The client-side Live Stream Controller component 228 receives user input information from the Interface Layer component 232 and, based thereon, communicates to the server-side Live Stream Generator 224 information indicating how a branching video should be traversed (e.g., which video segments should be played or queued). The Live Stream Controller 228 receives from the player 104, via the Interface Layer component 232, the current time/location in the playing video and the user engagement (events). Based on the tree structure of the branching video and the time/event information, the Live Stream Controller 228 determines the next video segment(s) that should be played and/or queued, and transmits this information to the Live Stream Generator 224 for update of the playlist 106 accordingly. In some instances, user inputs 112 are received from the screen 110, instead of or in addition to the player 104. It is to be appreciated that, although the described implementation includes the analysis of the branching video tree structure on the client side, this function can be performed on the server side in other implementations (i.e., the Live Stream Controller 228 can exist on the server side instead of the client side).

The Live Stream Generator component 224 is a lightweight server-side component that manages the media stream to the client in real time via manipulation of the playlist 106, based on information received from the Live Stream Controller 228. While media files can be preloaded onto the CDN 108 or other media server, the decision on while file should be concatenated to the media stream upon user interaction is made in real time by the Live Stream Generator 224. In one implementation, the Live Stream Generator 224 has two interfaces. The first interface is a standard streaming playlist endpoint used by the Live Stream Consumer 102. The playlist 106 is generated dynamically, while media files are received from the CDN 108. The second interface is a control endpoint, used by the Live Stream Controller 228, which receives client-side interactions and responds to them in real-time, as media is being streamed and/or played.

Figure 2B:
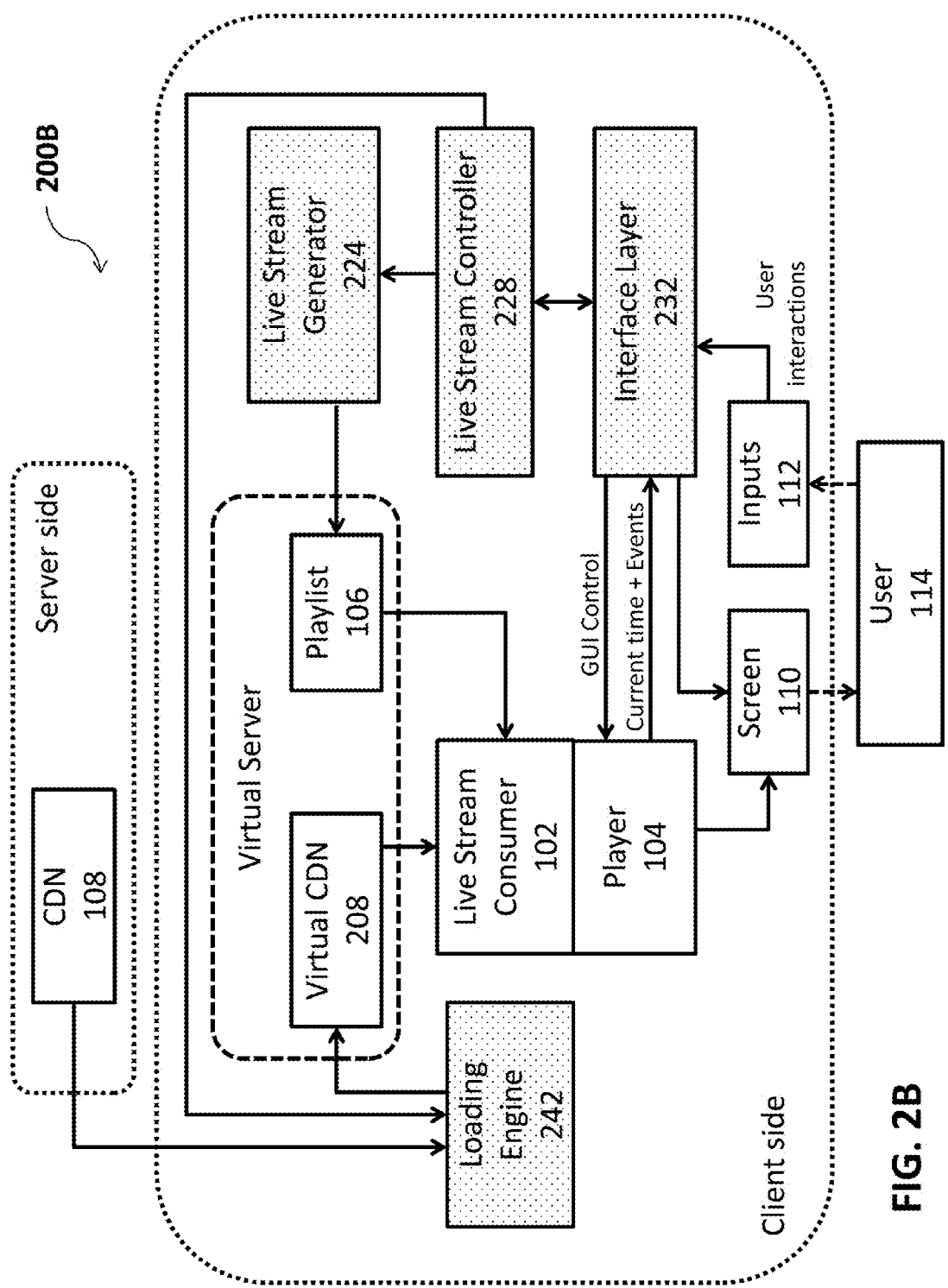

FIG. 2B depicts another implementation of a branching video architecture 200b in which additional functionality is provided on the client side by operating a virtual server on the client. This architecture 200b minimizes the need for data transfer between a client and server, thereby potentially increasing the speed and response time of the branching video player as compared to, for example, the architecture 200a shown in FIG. 2A. Further, this architecture 200b can be used on Apple® iPhone® devices and other devices, where the client side functionality is provided as part of a browser and the virtual server is a lightweight application.

In this example architecture 200b, the client-side virtual server maintains a Virtual CDN 208 and the playlist 106 (rather than having the playlist 106 on the server-side). Client-side components can then interface or otherwise communicate with the virtual server as if it were a remote server. The Live Stream Generator 224 also executes on the client rather than on a remote server. Media is provided to the client by the CDN 108, which is in communication with a Loading Engine component 242 on the client. The Loading Engine 242 preloads videos and other media from the CDN 108 and stores them on a computer-readable medium on the client, where they are accessible via the Virtual CDN 208. Entries in the playlist 106 then map to locations of the storage medium in the Virtual CDN 208 rather than to remote server addresses. The Live Stream Controller 228, which has knowledge of the branching media structure being played, can inform the Loading Engine 242 which media segments are in a potential playback path and, therefore, might need to be requested from the CDN 108.

In one implementation, a compiled mapping component is allows the standard player 104 to interface with the virtual server. Specifically, the Live Stream Consumer 102 accesses the playlist 106 on the virtual server as well as media data via Virtual CDN 208 in the same manner as if the playlist 106 and media were remotely hosted. The playlist 106 can be mapped to the virtual server, and the Virtual CDN 208 can be mapped to the Loading Engine 242. Other components shown in the architecture 200*b* can operate as described with respect to the architecture 200*a* shown in FIG. 2A.

Figure 4:
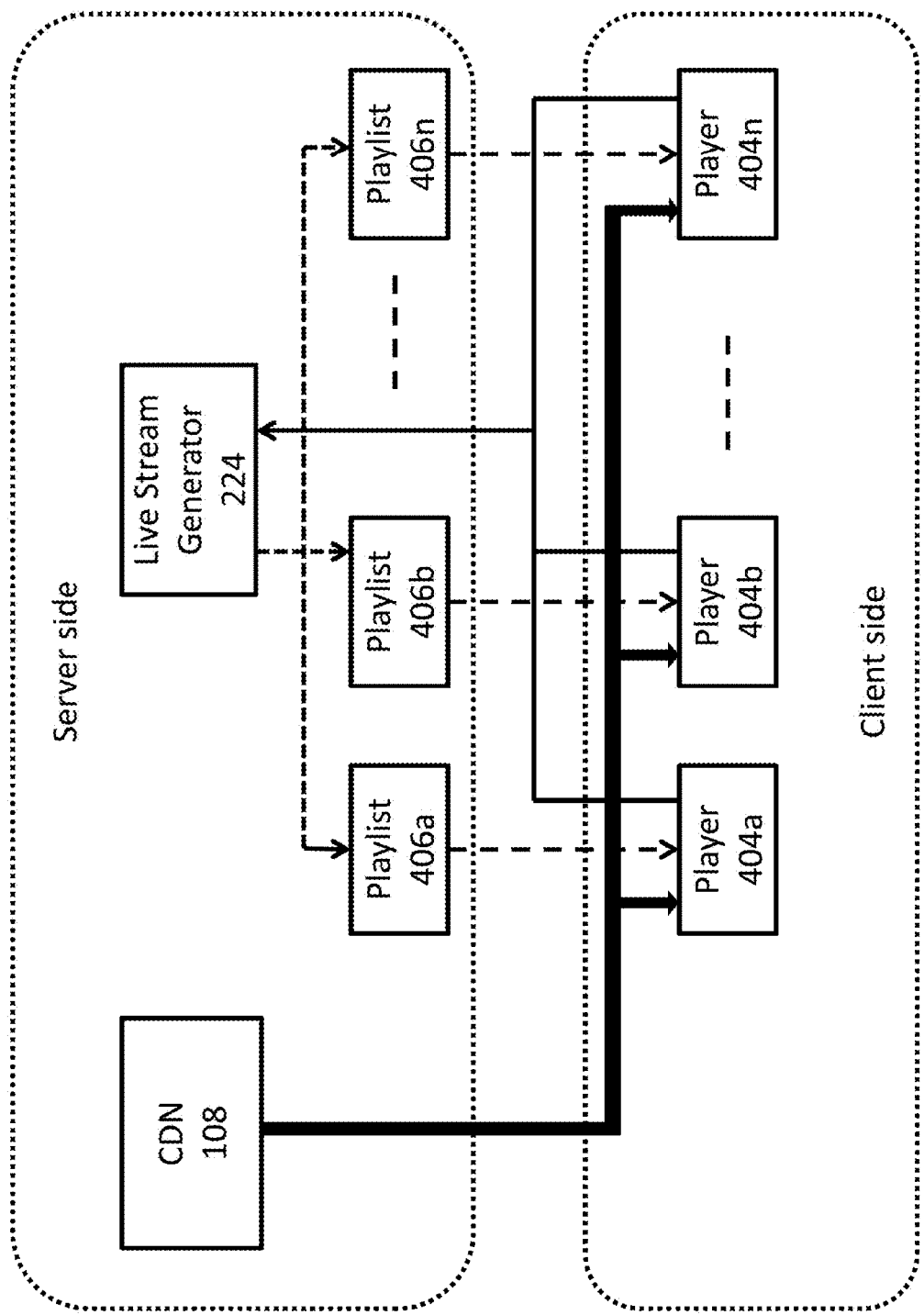
FIG. 4 depicts an example client-server architecture for a standard streaming video player modified to support branching video with multiple clients.

A standard streaming video player architecture (e.g., architecture 100 in FIG. 1) manages a single playlist (even for live, dynamic videos), which multiple video players use to determine which media files will be streamed. However, a branching streaming video player architecture (e.g., architecture 200A in FIG. 2A or architecture 200B in FIG. 2B) can support multiple concurrent sessions with individualized playlists. FIG. 4 illustrates a client-server architecture in which the Live Stream Generator component 224 manages multiple, different playlists 406*a* . . . 406*n* for respective client-side players 404*a* . . . 404*n*. Each component functions as described in the branching video player architecture 200A or 200B. However, as shown in FIG. 4, the Live Stream Generator 224 receives user input (e.g., decision) information from multiple video players 404*a* . . . 404*n* and updates the respective individualized playlists 406*a* . . . 406*n* according to user interactions received from potentially different users via the players 404*a* . . . 404*n*.

The techniques described herein can be implemented in any appropriate hardware or software. If implemented as software, the processes can execute on a system capable of running one or more commercial operating systems such as the Microsoft Windows® operating systems, the Apple OS X® operating systems, the Apple iOS® platform, the Google Android™ platform, the Linux® operating system and other variants of UNIX® operating systems, and the like. The software can be implemented on a general purpose computing device in the form of a computer including a processing unit, a system memory, and a system bus that couples various system components including the system memory to the processing unit.

The media content described herein can be presented to a user 114 associated with a user device that executes the player 104 and associated components. The user device can be a smartphone, tablet, laptop, palmtop, wireless telephone, television, gaming device, music player, mobile telephone, information appliance, workstation, a smart or dumb terminal, network computer, personal digital assistant, wireless device, minicomputer, mainframe computer, or other computing device, that is operated as a general purpose computer or a special purpose hardware device that can execute the functionality described herein.

The described architectures can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

The player 104 and associated components can be implemented as native applications, web applications, or other form of software. In some implementations, a particular application is in the form of a web page, widget, and/or Java, JavaScript, .Net, Silverlight, Flash, and/or other applet or plug-in that is downloaded to a user device and runs in conjunction with a web browser. An application and a web browser can be part of a single client-server interface; for example, an application can be implemented as a plugin to the web browser or to another framework or operating system. Any other suitable client software architecture, including but not limited to widget frameworks and applet technology can also be employed.

Media content can be provided to a user device executing the player 104 by CDN 108, which can be a web server, media server, a node in a content delivery network, or other content source. Some or all of the functionality described herein can be implemented in software downloaded to or existing on a user device and, in some instances, some or all of the functionality exists remotely. One of skill in the art will appreciate that certain functions can be performed client side, server side, or both. In some implementations, a user device serves only to provide output and input functionality, with the remainder of the processes being performed remotely.

Clients and servers executing the described functionality can communicate with each other through a communications network. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network can carry TCP/IP protocol communications and HTTP/HTTPS requests made by a web browser, and the connection between clients and servers can be communicated over such TCP/IP networks. The type of network is not a limitation, however, and any suitable network can be used.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Although the systems and methods described herein relate primarily to audio and video playback, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions.

Figure 5:
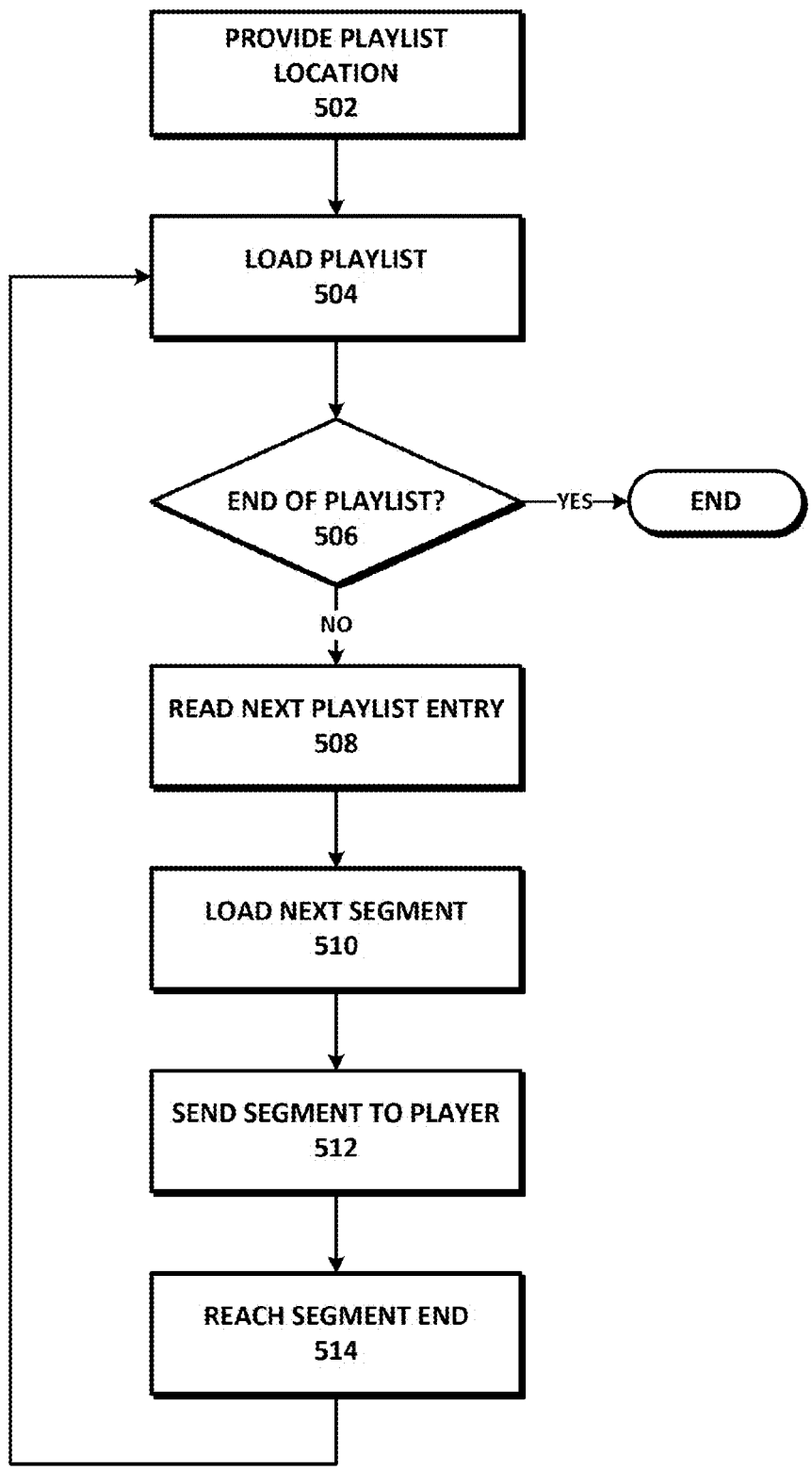
FIG. 5 depicts an example method of playing streaming content using a standard media player.

FIG. 5 depicts one implementation of a process for playing streaming video with a standard streaming video player (e.g., standard player architecture 100 in FIG. 1). In STEP 502, the player 104 provides the location (e.g., a uniform resource identifier) of a playlist 106 to a media consumer component (e.g., Live Stream Consumer 102), which loads the playlist 106 (STEP 504). In STEP 506, if the end of the playlist 106 has been reached, the process completes. Otherwise, the process continues to STEP 508, where the Live Stream Consumer 102 reads the next playlist entry. The Live Stream Consumer 102 loads the media segment specified by the entry (STEP 510) and sends it to the player 104 for playback (STEP 512). Upon reaching the segment end (STEP 514), the process returns to STEP 504, where the Live Stream Consumer 102 reloads the playlist 106 to determine if it has changed.

Figure 6:
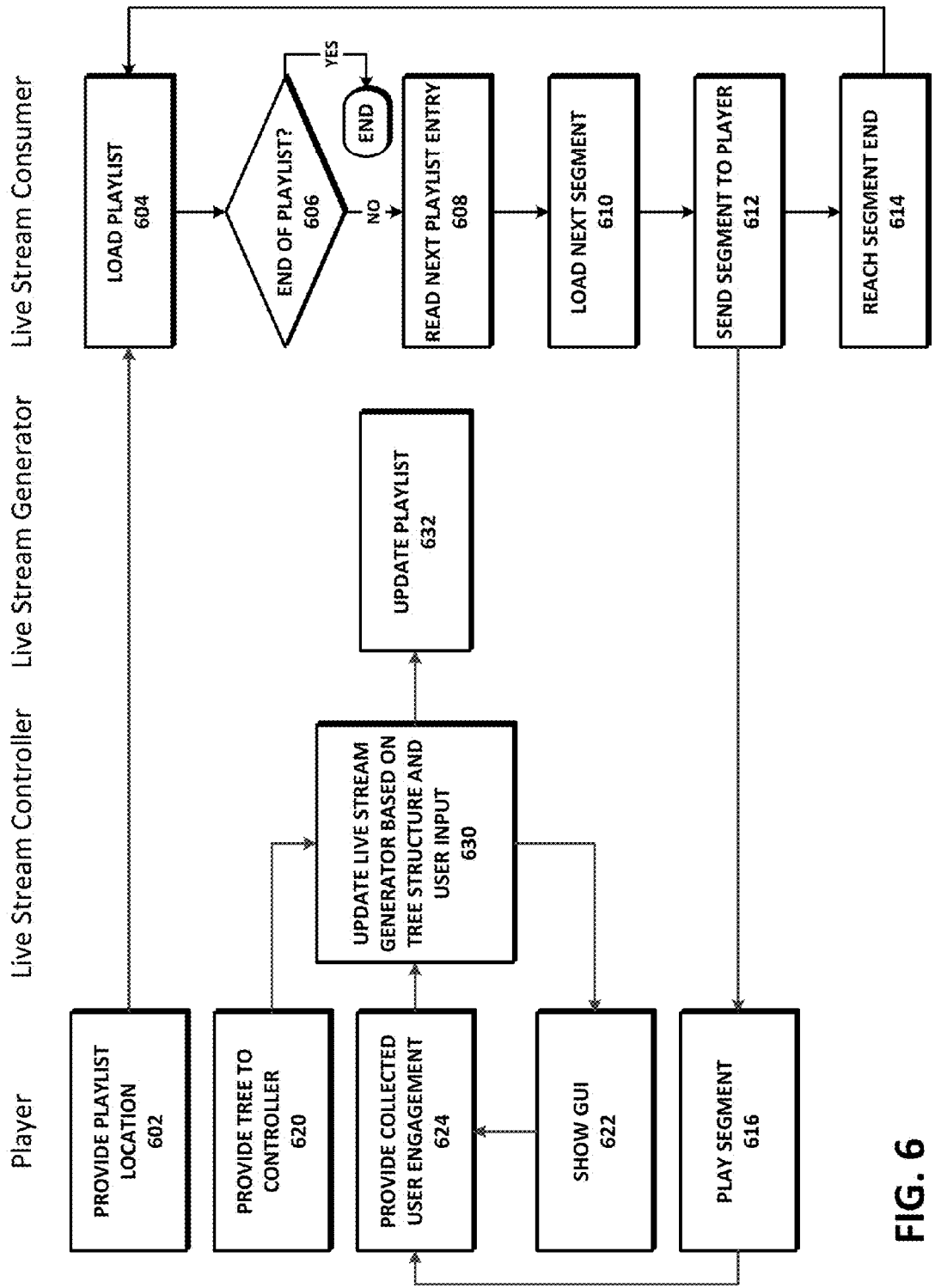
FIG. 6 depicts an example method of playing streaming branching content using a standard media player modified to support branching media content.

FIG. 6 depicts one implementation of a process for playing branching streaming video with a branching streaming video player (e.g., branching player architecture 200A in FIG. 2A or architecture 200B in FIG. 2B). Similarly to the standard player process illustrated in FIG. 5, the player 104 provides a playlist location to the Live Stream Consumer 102 (STEP 602), which loads the playlist 106, reads the playlist entries, load the corresponding segments, sends them to the player 104, and repeats the process until reaching the end of the playlist 106 (STEPS 604 to 614).

In STEP 616, upon receiving a media segment from the Live Stream Consumer 102, the player 104 can play the segment. The player 104 can also display a GUI (e.g., buttons, timers, etc.) overlaid on the playing segment (STEP 622). User interactions with the GUI and the segment playing on the display screen 110, as well as events fired based on interactions or other occurrences, can be collected and provided to the Live Stream Controller 228 (STEP 624). The player 104 can also provide the tree structure associated with a branching video being played to the Live Stream Controller 228 (STEP 620). Based on the received tree structure and user engagement information, the Live Stream Controller 228 updates the Live Stream Generator 224 (STEP 630), which updates the playlist 106 accordingly, as described herein (STEP 632). The Live Stream Controller 228 can also direct a GUI manager that is part of the player 104 to update the GUI shown by the player in to reflect events in the branching video (e.g., display new option buttons, update a running timer, etc.). The updates to the GUI can be synchronized with the branching video played by the player 104.

In one implementation, the player 104 provides a progress bar or timeline that a user can interact with to seek to different locations of a video. When seeking to an earlier location in the video, the branching video player architectures 200A and 200B behaves differently than the standard video player architecture 100. For the standard player architecture 100, when the user seeks to an earlier location, the player 104 need only jump back to a previous playlist entry and continue playback from the corresponding video location. On the other hand, for the branching player architectures 200A and 200B, seeking backwards results in creating a new playlist starting from the requested point in time. This action is taken because of the nature of branching video; i.e., the user can interact differently and make different choices after returning to an earlier point in time and, thus, the segments added to the playlist based on the user interactions are not guaranteed to be the same as the original playlist. For example, referring back to FIG. 3B, if the user were to seek backward to "Video B2 byte: 100 1 sec", a new playlist would be created containing only that entry. Note that, in some implementations, user interactions are recorded by the player 104 and/or Live Stream Controller 228, making it unnecessary to store the interactions in a playlist.

Figure 7:
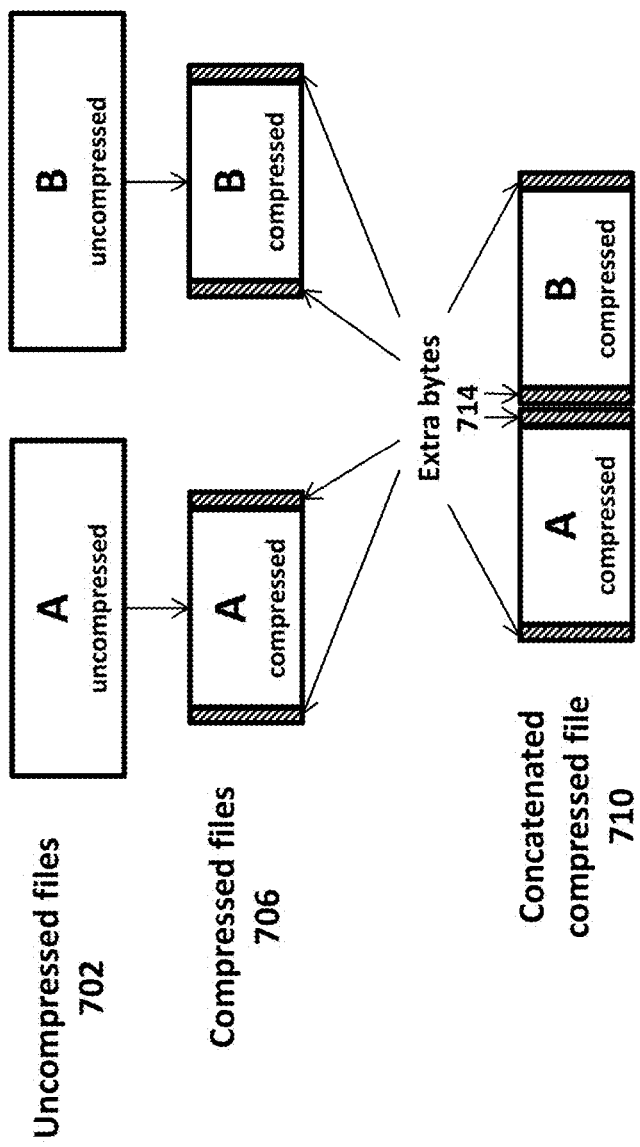
FIG. 7 depicts an example compression and concatenation of media files.

As described above, branching media content segments can be seamless, such that there is no noticeable audio and/or video gap between segments, and the media content appears as a continuous presentation to the viewer. However, when compressing audio files using lossy audio compression, such as MPEG-1 or MPEG-2 Audio Layer III (MP3), extra bytes are added to the beginning and end of the compressed file due to the operation of the decoder and encoder. Thus, as shown in FIG. 7, when uncompressed audio files 702 are converted to compressed versions 706 and are concatenated into a continuous audio file 710, the continuous audio file 710 has gaps in audio where extra bytes 714 were added during encoding.

The Seamless Multimedia Assembly application discloses a technique for replacing uncompressed audio with gapless uncompressed audio for Flash Video (FLV) files. However, this method demands real-time decoding of audio/video files on the client (video player) side and, therefore, does not function in an architecture where a standard streaming video player is enhanced to support branching streaming video, such as described herein. To minimize the amount of work performed in real time while media is streaming and/or being played, the described architecture can include a server-side component that pre-produces seamless segments based on a tree structure associated with branching media content, such that segments retrieved from the cloud already exist in a seamless format and, when a standard player plays the segments one after the other, the result is a seamless presentation.

In one implementation, to create a seamless audio segment, a particular audio segment is identified, as well as the segment preceding it (if any) and the segment following it (if any). The order of segments can be determined based on knowledge of the tree structure associated with a media presentation including the identified audio segment. In one instance, if there are multiple preceding segments and/or multiple following segments, any preceding or following segment, as applicable, can be selected for use with the following technique. If the identified audio segment (or preceding or following segment(s)) is encoded with video and/or exists in a compressed format, the identified audio segment (or preceding or following segment(s)) can be de-multiplexed and/or converted to an uncompressed format as needed.

Figure 8:
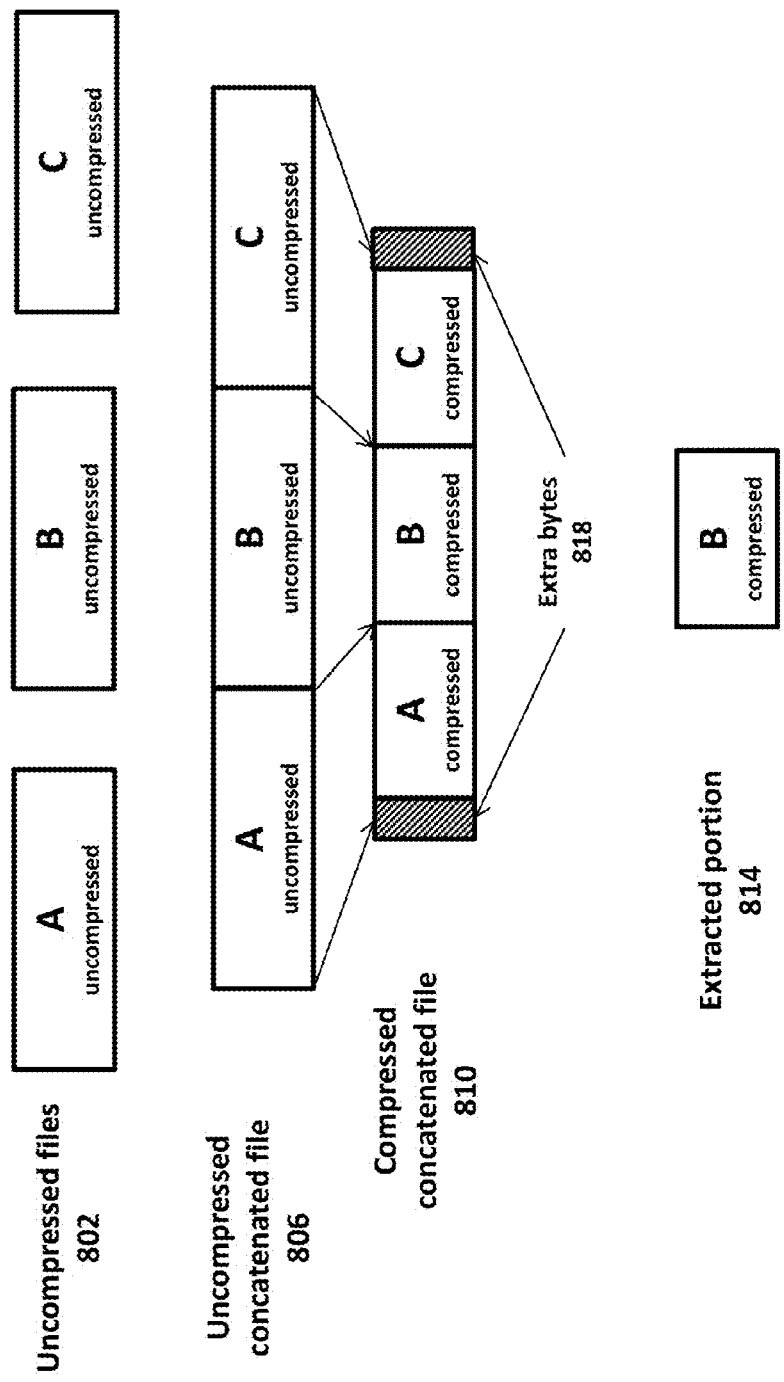
FIG. 8 depicts an example concatenation, compression, and extraction of media files.

Referring to FIG. 8, the uncompressed audio segments 802 (including the identified audio segment B, preceding audio segment A, and following audio segment C) are concatenated into an uncompressed concatenated file 806. The concatenated file 806 is then converted into a compressed format (concatenated compressed file 810) which, because of the nature of the encoder, results in extra bytes 818 existing at the header and/or footer of the compressed file 810. An intermediate portion 814 (e.g., the middle) is then extracted from the compressed concatenated file 810 and is used as the seamless version of the originally identified audio segment. If desired, the extracted intermediate portion 814 can be converted to an uncompressed format.

Figure 9A:
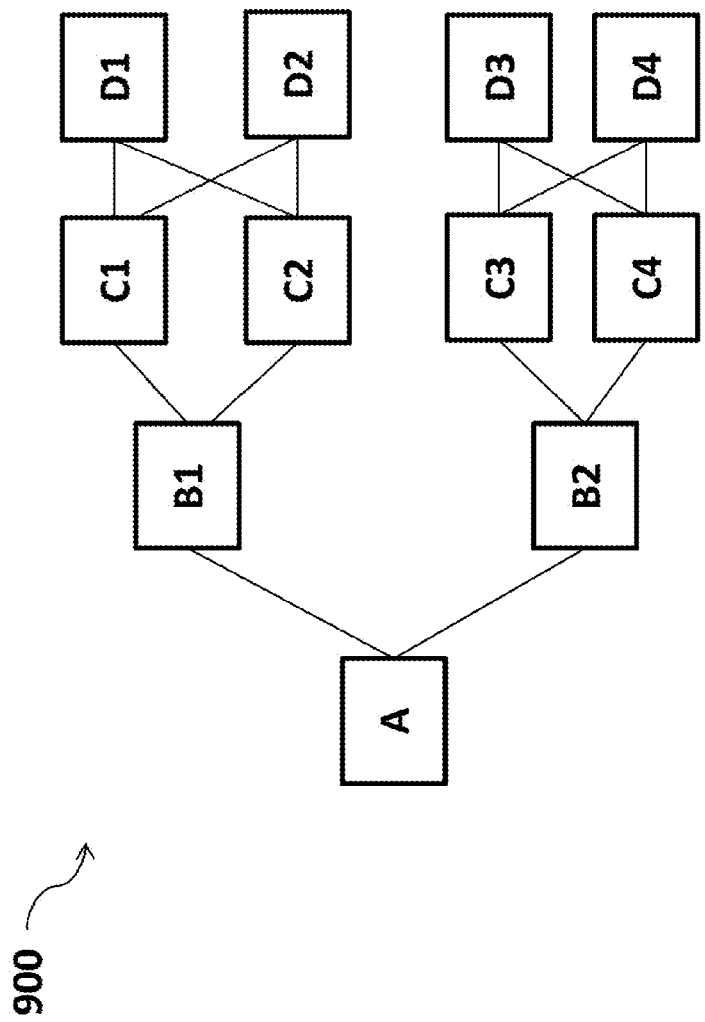
FIG. 9A depicts an example branching tree structure for a media presentation.

In a tree-structured media presentation, the process described above with respect to FIG. 8 can be repeated for some or all nodes having corresponding audio/video segments on the tree. An example tree structure 900 corresponding to an interactive branching video is shown in FIG. 9A. A user watching the interactive video can make choices during the presentation that result in the user traversing a path consisting of {A, B1, C2, D2}, where the audio/video segments associated with those nodes are seamlessly joined so that the user experiences a continuous presentation without noticeable gaps, jumps, buffering, or other similar delays. Other paths defined by the nodes in the tree structure 900 and connections therebetween are possible.

FIG. 9B depicts one implementation of the seamless audio segment creation process applied to the tree structure 900 of FIG. 9A. In this example, if a node has multiple preceding nodes, any one of them can be chosen as the preceding node and, if a node has multiple following nodes, any one of them can be chosen as the following node. If a node is at the beginning of a path, a preceding node is unnecessary. Likewise, if a node is at the end of a path, a following node is not needed. Thus, to obtain a seamless version of each node in the tree structure 900, the groupings shown in FIG. 9B under the heading "Concatenate" are made, and the resulting seamless nodes are listed under the heading "Extract," for each corresponding row. For example, to obtain a seamless version of segment B1, nodes {A, B1, C1} are concatenated and compressed, and the portion corresponding to B1 is extracted. As another example, to obtain a seamless version of segment D4, nodes {C4, D4} are concatenated and compressed, and the portion corresponding to D4 is extracted. In the previous example, only two nodes are concatenated because there is no node following D4. Note, however, that other groupings are possible to obtain a seamless version of any particular node in the tree structure 900. For example, a seamless version of C2 can be obtained using either {B1, C2, D1} or {B1, C2, D2}. Further, for a grouping such as {C1, D1}, either or both of C1 and D1 can be extracted as seamless segments.

In another implementation, more than three segments corresponding to nodes in the tree structure 900 can be concatenated and compressed, and more than one segment portion can be extracted from the concatenated compressed file. For example, referring to FIG. 9C, the segments corresponding to nodes {A, B1, C1, D1} can be combined and compressed, and seamless segments corresponding to all four can be extracted. The foregoing technique allows the nodes corresponding to a particular tree structure to be processed and seamless segments obtained using fewer, and in some cases a minimal number of, operations compared to the creation of one seamless segment at a time.

Figure 10A:
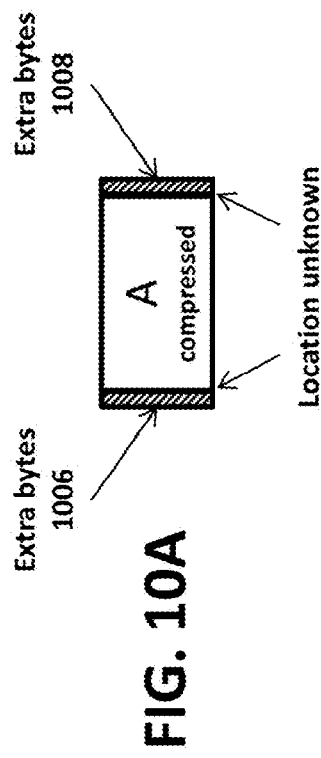
FIGS. 10A and 10B depict example compression and concatenation of media files.
Figure 10B:
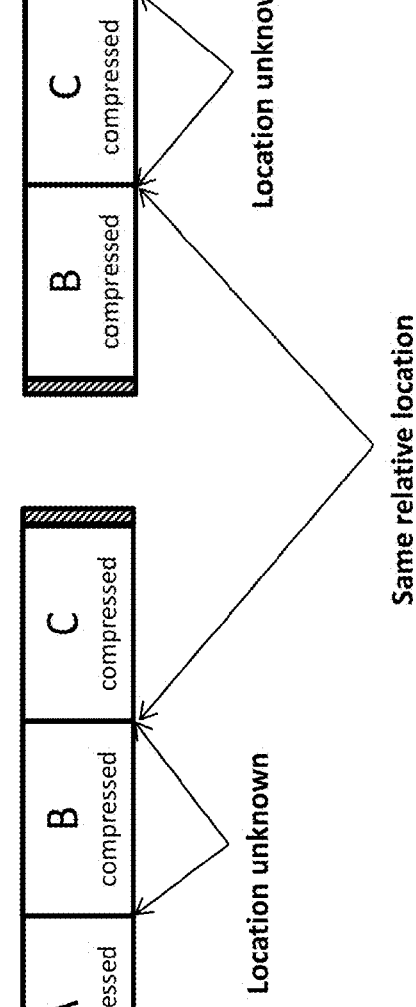

Referring now to FIG. 10A, in one implementation, when a media file (A) is compressed it may become sample inaccurate, meaning that the exact sample location of the cut (to obtain the file portion between the extra bytes 1006, 1008 at the beginning and end of the file, respectively) is unknown. As such, if a segment is compressed by itself (no concatenation), then the seamless portion cannot be accurately extracted. On the other hand, as shown in FIG. 10B, when multiple segments are combined, the exact sample location is still unknown, but the cut between two particular segments (here, B and C) occurs in the same location relative to the two segments regardless of their position in a concatenated compressed file.

Figure 11:
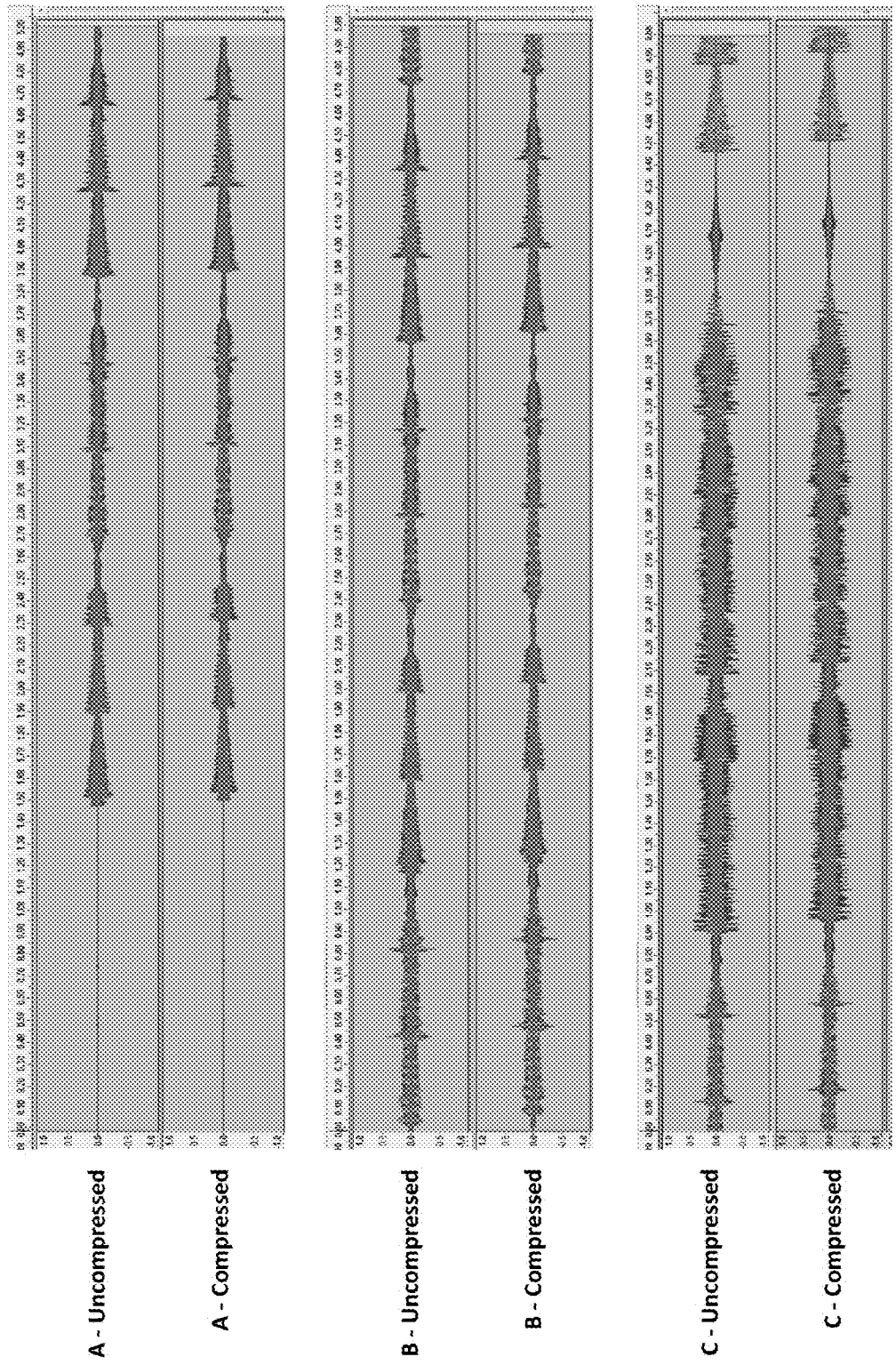
FIG. 11 depicts example waveforms of compressed and uncompressed versions of media files.

FIG. 11 shows the effects of waveform compression on three segments {A, B, C} to which the seamless version creation process is applied. Of note, the audio for the compressed version of segment A begins slightly later and ends sooner than the audio for the uncompressed version of segment A. The end portion of the uncompressed segment A that does not appear in the compressed version is moved to the beginning of the compressed version of segment B. Likewise, an end portion of the uncompressed version of B that does not appear in the compressed version is moved to the beginning of the compressed version of segment C. Although certain portions of audio data are shifted between separate segment file boundaries, the extracted compressed segments operate as segment versions that can be seamlessly joined to one another.

Figure 12:
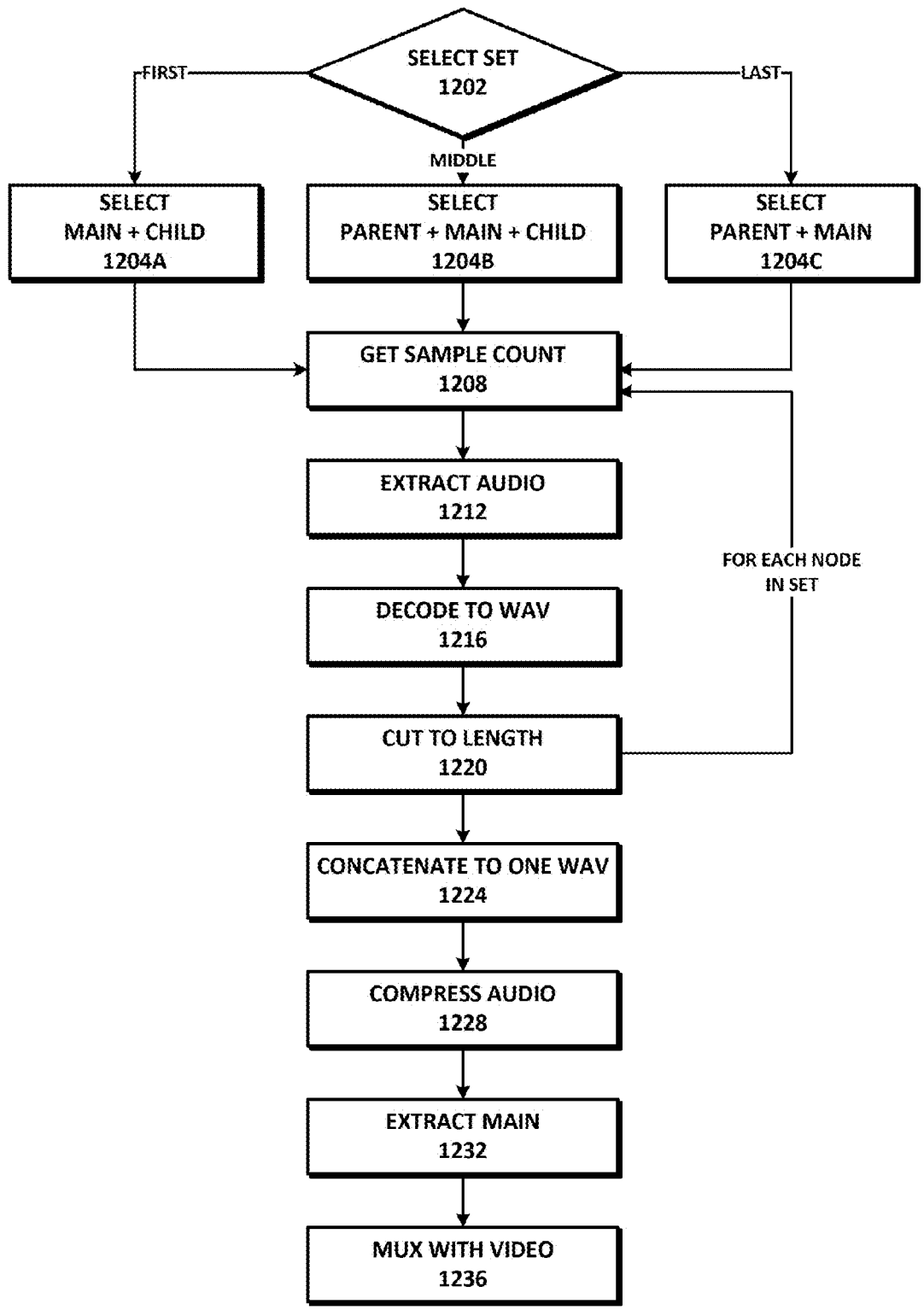
FIG. 12 depicts an example method for creating a seamless version of a media segment.

FIG. 12 depicts one implementation of a method for creating a seamless audio segment from a collection of compressed audio/video segments that have an order defined by, e.g., a tree structure. In STEP 1202, a subset of the compressed segments is selected (e.g., two, three, or more segments). In this example, two or three segments corresponding to nodes of a tree structure are selected. Possible selections include a main node and its child (e.g., the main node is the first node in a path of the tree structure) (STEP 1204A); a main node and its parent and child (e.g., the main node has one or more preceding and following nodes) (STEP 1204B); and a main node and its parent (e.g., the main node is the last node in a path of the tree structure) (STEP 1204C).

Because, in this example, the segments associated with the selected nodes exist in a compressed audio/video format, the uncompressed audio segments are obtained by determining the sample count, extracting (e.g., de-multiplexing) the audio, decoding the audio to an uncompressed format (e.g., .WAV) and, if necessary, trimming the uncompressed audio to its original or other length (STEP 1208 to STEP 1220). As one example, audio in a compressed .OGG format can be converted to an uncompressed .WAV format using FFmpeg with command line options as follows: "ffmpeg -i in.ogg -vn -c:a pcm_s16le -ac 2 -ar 44100 -y out.wav". The foregoing steps can be applied to each node in the selected set of segments.

In STEP 1224, the uncompressed audio segments are concatenated to a single file and, in STEP 1228, the file is compressed using, e.g., WebM or other suitable compression techniques. As one example, the single file in .WAV format can be encoded into a compressed audio file using FFmpeg with command line options as follows: "ffmpeg in.wav -vn -c:a libvorbis -b:a 112k -y outAudio.webm". The portion of the compressed concatenated file corresponding to the main segment is then extracted (STEP 1232) and, if desired, can be multiplexed with its corresponding video portion to create a seamless audio/video segment (STEP 1236). An example command to extract the main segment from an audio WebM file using FFmpeg is: "ffmpeg -i outAudio.webm -vn -c:a copy -ss {duration of parent segment} -t {duration of main segment} -y mainAudio.webm", where the duration values are given in seconds with a precision of milliseconds. Further, an example command to multiplex the resulting main segment audio with the corresponding main segment video using FFmpeg is as follows: "ffmpeg -i mainVideo.webm -i mainAudio.webm -c copy -map 0:v -map 1:a -map -0:a -map -1:v -y main.webm". The method illustrated in FIG. 12 can be repeated for all or a subset of nodes in a particular tree structure.

While various implementations of the present invention have been described herein, it should be understood that they have been presented by example only. For example, one of skill in the art will appreciate that the techniques for creating seamless audio segments can be applied to creating seamless video segments and other forms of seamless media as well. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

What is claimed is:

1. A computer-implemented method comprising:
   a) selecting an uncompressed media file;
   b) identifying, based on the selected uncompressed media file, at least one of a preceding uncompressed media file and a following uncompressed media file;
   c) concatenating the selected uncompressed media file and at least one of the preceding uncompressed media file and the following uncompressed media file to form a concatenated uncompressed media file;
   d) compressing the concatenated uncompressed media file to form a compressed media file; and
   e) selecting a portion of the compressed media file as a compressed version of the selected uncompressed media file, wherein selecting the portion comprises extracting an intermediate portion of the compressed media file and storing the extracted intermediate portion as the compressed version of the selected uncompressed media file.

2. The method of claim 1, wherein the media file comprises audio data.

3. The method of claim 1, further comprising providing a video tree comprising a plurality of branches, each branch comprising a plurality of media files.

4. The method of claim 3, wherein the identification of the at least one of the preceding uncompressed media file and the following uncompressed media file is based on a branch of the video tree.

5. The method of claim 3, further comprising performing steps a) through e) for a plurality of media files in the video tree.

6. The method of claim 3, wherein the media files in the video tree each comprise compressed audio data, the method further comprising selecting a media file from the video tree, and converting the compressed audio data of the selected media file from the video tree to uncompressed audio data, wherein the selected uncompressed media file comprises the uncompressed audio data.

7. The method of claim 1, wherein the concatenating comprises concatenating the selected uncompressed media file to the end of the preceding uncompressed media file.

8. The method of claim 1, wherein the concatenating comprises concatenating the following uncompressed media file to the end of the selected uncompressed media file.

9. The method of claim 1, further comprising storing a duration of the selected uncompressed media file, and wherein selecting the portion is based at least in part on the stored duration.

10. The method of claim 1, further comprising selecting a plurality of portions of the compressed media file as respective compressed versions of the concatenated uncompressed media files.

11. The method of claim 10, wherein playback occurs seamlessly among the compressed versions of the concatenated uncompressed media files.

12. A system comprising:
   one or more computers programmed to perform operations comprising:
   a) selecting an uncompressed media file;
   b) identifying, based on the selected uncompressed media file, at least one of a preceding uncompressed media file and a following uncompressed media file;
   c) concatenating the selected uncompressed media file and at least one of the preceding uncompressed media file and the following uncompressed media file to form a concatenated uncompressed media file;
   d) compressing the concatenated uncompressed media file to form a compressed media file; and
   e) selecting a portion of the compressed media file as a compressed version of the selected uncompressed media file, wherein selecting the portion comprises extracting an intermediate portion of the compressed media file, and storing the extracted intermediate portion as the compressed version of the selected uncompressed media file.

13. The system of claim 12, wherein the media file comprises audio data.

14. The system of claim 12, wherein the operations further comprise providing a video tree comprising a plurality of branches, each branch comprising a plurality of media files.

15. The system of claim 14, wherein the identification of the at least one of the preceding uncompressed media file and the following uncompressed media file is based on a branch of the video tree.

16. The system of claim 14, wherein the operations further comprise performing steps a) through e) for a plurality of media files in the video tree.

17. The system of claim 14, wherein the media files in the video tree each comprise compressed audio data, and wherein the operations further comprise selecting a media file from the video tree, and converting the compressed audio data of the selected media file from the video tree to uncompressed audio data, wherein the selected uncompressed media file comprises the uncompressed audio data.

18. The system of claim 12, wherein the concatenating comprises concatenating the selected uncompressed media file to the end of the preceding uncompressed media file.

19. The system of claim 12, wherein the concatenating comprises concatenating the following uncompressed media file to the end of the selected uncompressed media file.

20. The system of claim 12, wherein the operations further comprise storing a duration of the selected uncompressed media file, and wherein selecting the portion is based at least in part on the stored duration.

21. The system of claim 12, wherein the operations further comprise selecting a plurality of portions of the compressed media file as respective compressed versions of the concatenated uncompressed media files.

22. The system of claim 21, wherein playback occurs seamlessly among the compressed versions of the concatenated uncompressed media files.

23. A computer-implemented method comprising:
a) providing a video tree comprising a plurality of branches, each branch comprising a plurality of media files, wherein the media files in the video tree each comprise compressed audio data;
b) selecting a media file from the video tree;
c) converting the compressed audio data of the selected media file from the video tree to uncompressed audio data to form an uncompressed media file comprising the uncompressed audio data;
d) identifying, based on the selected uncompressed media file, at least one of a preceding uncompressed media file and a following uncompressed media file;
e) concatenating the selected uncompressed media file and at least one of the preceding uncompressed media file and the following uncompressed media file to form a concatenated uncompressed media file;
f) compressing the concatenated uncompressed media file to form a compressed media file; and
g) selecting a portion of the compressed media file as a compressed version of the selected uncompressed media file.

24. The method of claim 23, wherein the identification of the at least one of the preceding uncompressed media file and the following uncompressed media file is based on a branch of the video tree.

25. The method of claim 23, further comprising performing steps b) through g) for a plurality of media files in the video tree.

26. The method of claim 23, wherein the concatenating comprises concatenating the selected uncompressed media file to the end of the preceding uncompressed media file.

27. The method of claim 23, wherein the concatenating comprises concatenating the following uncompressed media file to the end of the selected uncompressed media file.

28. The method of claim 23, further comprising storing a duration of the selected uncompressed media file, and wherein selecting the portion is based at least in part on the stored duration.

29. A system comprising:
one or more computers programmed to perform operations comprising:
a) providing a video tree comprising a plurality of branches, each branch comprising a plurality of media files, wherein the media files in the video tree each comprise compressed audio data;
b) selecting a media file from the video tree;
c) converting the compressed audio data of the selected media file from the video tree to uncompressed audio data to form an uncompressed media file comprising the uncompressed audio data;
d) identifying, based on the selected uncompressed media file, at least one of a preceding uncompressed media file and a following uncompressed media file;
e) concatenating the selected uncompressed media file and at least one of the preceding uncompressed media file and the following uncompressed media file to form a concatenated uncompressed media file;
f) compressing the concatenated uncompressed media file to form a compressed media file; and
g) selecting a portion of the compressed media file as a compressed version of the selected uncompressed media file.

30. The system of claim 29, wherein the identification of the at least one of the preceding uncompressed media file and the following uncompressed media file is based on a branch of the video tree.

31. The system of claim 29, wherein the operations further comprise performing steps b) through g) for a plurality of media files in the video tree.

32. The system of claim 29, wherein the concatenating comprises concatenating the selected uncompressed media file to the end of the preceding uncompressed media file.

33. The system of claim 29, wherein the concatenating comprises concatenating the following uncompressed media file to the end of the selected uncompressed media file.

34. The system of claim 29, wherein the operations further comprise storing a duration of the selected uncompressed media file, and wherein selecting the portion is based at least in part on the stored duration.

35. A computer-implemented method comprising:
a) selecting an uncompressed media file;
b) identifying, based on the selected uncompressed media file, at least one of a preceding uncompressed media file and a following uncompressed media file;
c) concatenating the selected uncompressed media file and at least one of the preceding uncompressed media file and the following uncompressed media file to form a concatenated uncompressed media file;
d) compressing the concatenated uncompressed media file to form a compressed media file; and
e) selecting a plurality of portions of the compressed media file as respective compressed versions of the concatenated uncompressed media files, wherein playback occurs seamlessly among the compressed versions of the concatenated uncompressed media files.

36. The method of claim 35, wherein the media file comprises audio data.

37. The method of claim 35, further comprising providing a video tree comprising a plurality of branches, each branch comprising a plurality of media files.

38. The method of claim 37, wherein the identification of the at least one of the preceding uncompressed media file and the following uncompressed media file is based on a branch of the video tree.

39. The method of claim 37, further comprising performing steps a) through e) for a plurality of media files in the video tree.

40. The method of claim 35, further comprising storing a duration of the selected uncompressed media file, and wherein selecting the portion is based at least in part on the stored duration.

41. A system comprising:
one or more computers programmed to perform operations comprising:
a) selecting an uncompressed media file;
b) identifying, based on the selected uncompressed media file, at least one of a preceding uncompressed media file and a following uncompressed media file;
c) concatenating the selected uncompressed media file and at least one of the preceding uncompressed media file and the following uncompressed media file to form a concatenated uncompressed media file;
d) compressing the concatenated uncompressed media file to form a compressed media file; and
e) selecting a plurality of portions of the compressed media file as respective compressed versions of the concatenated uncompressed media files, wherein playback occurs seamlessly among the compressed versions of the concatenated uncompressed media files.

42. The system of claim 41, wherein the media file comprises audio data.

43. The system of claim 41, wherein the operations further comprise providing a video tree comprising a plurality of branches, each branch comprising a plurality of media files.

44. The system of claim 43, wherein the identification of the at least one of the preceding uncompressed media file and the following uncompressed media file is based on a branch of the video tree.

45. The system of claim 43, wherein the operations further comprise performing steps a) through e) for a plurality of media files in the video tree.

46. The system of claim 41, wherein the operations further comprise storing a duration of the selected uncompressed media file, and wherein selecting the portion is based at least in part on the stored duration.

* * * * *